(12) United States Patent
Ando

(10) Patent No.: US 12,214,583 B2
(45) Date of Patent: Feb. 4, 2025

(54) RECORDING METHOD AND RECORDING DEVICE

(71) Applicant: SEIKO EPSON CORPORATION, Tokyo (JP)

(72) Inventor: Keigo Ando, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 266 days.

(21) Appl. No.: 17/865,692

(22) Filed: Jul. 15, 2022

(65) Prior Publication Data
US 2023/0022251 A1  Jan. 26, 2023

(30) Foreign Application Priority Data

Jul. 16, 2021  (JP) ................................. 2021-117936

(51) Int. Cl.
*B41J 11/00* (2006.01)
*B41J 2/21* (2006.01)
*C09D 11/40* (2014.01)

(52) U.S. Cl.
CPC .......... *B41J 11/0022* (2021.01); *B41J 2/2117* (2013.01); *C09D 11/40* (2013.01)

(58) Field of Classification Search
CPC ....... B41J 11/00; B41J 2/21; B41J 2/01; B41J 2/175; B41J 3/407; B41M 5/50; B41M 5/00; B41M 7/00; B41M 1/18; B41M 1/20; C09D 11/00; C09D 11/322; C09D 11/30; C09D 11/40
See application file for complete search history.

(56) References Cited

U.S. PATENT DOCUMENTS

| 9,187,657 | B2 * | 11/2015 | Yano | B41J 2/2117 |
| 2015/0035898 | A1 * | 2/2015 | Okuda | C09D 175/04 347/20 |

(Continued)

FOREIGN PATENT DOCUMENTS

| CN | 110194005 A | 9/2019 |
| CN | 112238692 A | 1/2021 |
| JP | 2015-083684 A | 4/2015 |

*Primary Examiner* — John Zimmermann
(74) *Attorney, Agent, or Firm* — Harness, Dickey & Pierce, P.L.C.

(57) ABSTRACT

A recording method includes: a white ink attachment step of ejecting a white ink composition containing a white coloring material from a white ink jet head and attaching the white ink composition to a recording medium; a non-white ink attachment step of ejecting a non-white ink composition containing a non-white coloring material from a non-white ink jet head and attaching the non-white ink composition to the recording medium; and a primary drying step of heating the white ink composition and the non-white ink composition attached to the recording medium by a drying mechanism. In the white ink attachment step and the non-white ink attachment step, a layer containing the white ink composition and the non-white ink composition is formed by performing main scanning multiple times, in which the ink compositions are ejected and attached to the recording medium, and by attaching the white ink composition and the non-white ink composition to the same scanning region in the recording medium by the same main scanning, while moving a position of an ink jet head relative to the recording medium.

16 Claims, 2 Drawing Sheets

(56) References Cited

U.S. PATENT DOCUMENTS

| | | | |
|---|---|---|---|
| 2017/0247561 A1* | 8/2017 | Nakagawa | B41J 11/0015 |
| 2019/0264056 A1 | 8/2019 | Okuda et al. | |
| 2020/0087527 A1* | 3/2020 | Okuda | B41J 2/2117 |
| 2020/0307254 A1* | 10/2020 | Ohashi | B41J 3/4078 |
| 2021/0017414 A1 | 1/2021 | Asakawa et al. | |
| 2021/0170779 A1* | 6/2021 | Asakawa | C09D 11/033 |
| 2022/0203698 A1* | 6/2022 | Watanabe | B41J 2/2107 |

* cited by examiner

RECORDING METHOD AND RECORDING DEVICE

The present application is based on, and claims priority from JP Application Serial Number 2021-117936, filed Jul. 16, 2021, the disclosure of which is hereby incorporated by reference herein in its entirety.

BACKGROUND

1. Technical Field

The present disclosure relates to a recording method and a recording device.

2. Related Art

An ink jet recording method can record high-definition images with a relatively simple device, and achieves rapid development in various fields. Among the fields, various studies have been conducted on ejection stability and the like. For example, JP-A-2015-83684 discloses an ink composition containing at least one coloring material selected from a metal compound and hollow resin particles, and a sulfonic acid group-containing polymer, in order to improve concealing properties and rub resistance.

A recorded material having good visibility of a color image is obtained by recording a base layer by using the ink composition in JP-A-2015-83684, and then recording a color image layer. On the other hand, the method of stacking the base layer and the color image layer in such a manner had problems that a recording speed becomes slow because time is taken to stack the layers and a large head is required. In addition, there was a problem that an excellent image quality is not obtained when the large head is not required or the recording speed is fast.

SUMMARY

The present disclosure provides a recording method including: a white ink attachment step of ejecting a white ink composition containing a white coloring material from a white ink jet head and attaching the white ink composition to a recording medium; a non-white ink attachment step of ejecting a non-white ink composition containing a non-white coloring material from a non-white ink jet head and attaching the non-white ink composition to the recording medium; and a primary drying step of heating the white ink composition and the non-white ink composition attached to the recording medium by a drying mechanism. In the white ink attachment step and the non-white ink attachment step, a layer containing the white ink composition and the non-white ink composition is formed by performing main scanning multiple times, in which the ink compositions are ejected and attached to the recording medium, and by attaching the white ink composition and the non-white ink composition to the same scanning region in the recording medium by the same main scanning, while moving a position of an ink jet head relative to the recording medium.

The present disclosure provides a recording device that performs recording by the recording method including: a white ink jet head configured to eject a white ink composition containing a white coloring material and attach the white ink composition to a recording medium; a non-white ink jet head configured to eject a non-white ink composition containing a non-white coloring material and attach the non-white ink composition to the recording medium; a drying mechanism configured to dry the white ink composition and the non-white ink composition attached to the recording medium, and a control section configured to perform control of recording by using the white ink jet head and the non-white ink jet head.

DESCRIPTION OF EXEMPLARY EMBODIMENTS

Figure 1:
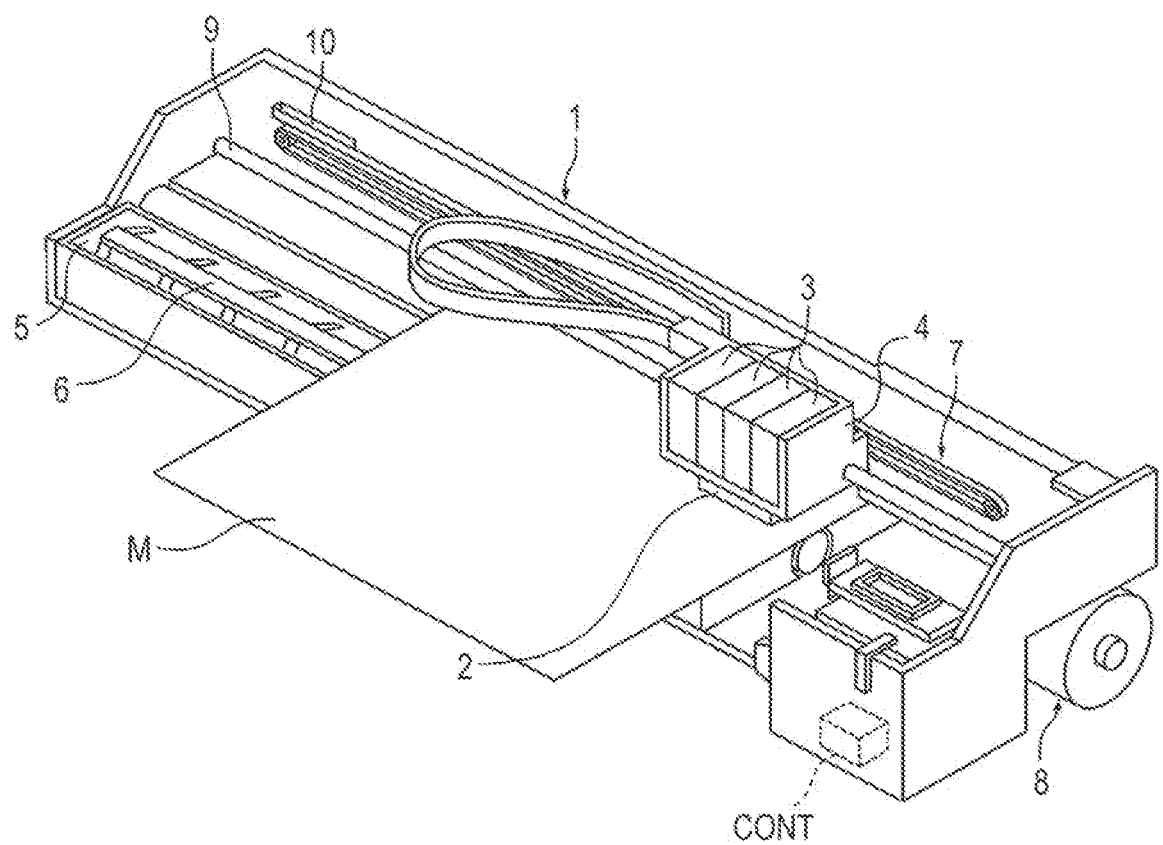
FIG. 1 illustrates an example of a recording device used in the present embodiment.

Hereinafter, an embodiment of the present disclosure (hereinafter referred to as "the present embodiment") is described in detail with reference to the drawings. The present disclosure is not limited thereto and can be variously modified without deviating from the scope of the present disclosure as described in the claims. In the drawings, the same components are designated by the same reference numerals and the same description will be omitted. The positional relationship, such as left, right, top, and bottom, should be based on the positional relationship illustrated in the drawings unless otherwise particularly specified. Furthermore, the dimensional ratios in the drawings are not limited to the ratios illustrated in the drawings.

In the present embodiment, a white ink jet head and a non-white ink jet head are simply referred to as "ink jet head", unless otherwise specified. Similarly, the white ink composition and the non-white ink composition are simply referred to as "ink composition", unless otherwise specified.

The "main scanning" refers to an operation of ejecting the ink composition from the ink jet head and attaching the ink composition to a recording medium, while moving the ink jet head to a position relative to the recording medium. The ink jet head can be mounted on a carriage, for example. The ink jet head may be moved by the movement of the carriage, which is also a movement of the ink jet head.

The "main scanning direction" refers to a width direction of the recording medium, which is a moving direction of the ink jet head. The "main scanning" is a movement of the ink jet head to the position relative to the recording medium. The ink jet head may move relative to the recording medium, or the recording medium may move relative to the ink jet head. A direction of the movement to the relative position as such is a main scanning direction. The movement of the ink jet head to the position relative to the recording medium can be referred to as a movement of the recording medium to a position relative to the ink jet head. That is, it is a relative movement between the ink jet head and the recording medium.

On the other hand, "sub-scanning" refers to an operation of moving the relative position between the ink jet head and the recording medium in a sub-scanning direction. The "sub-scanning direction" is a direction intersecting the main scanning direction.

For example, recording can be performed by repeating an operation of attaching an ink composition to a certain region in the recording medium by main scanning, moving the recording medium slightly, for example, by sub-scanning, and then performing next main scanning, to adjacently or partially overlap and attach an ink composition with and to the previously attached ink composition. Also, the "sub-scanning" is a movement of the ink jet head to the position relative to the recording medium. The ink jet head may move relative to the recording medium, and the recording medium may move relative to the ink jet head. A direction of such a relative movement is a sub-scanning direction.

Recording may be performed by performing each of main scanning and sub-scanning multiple times. For example, the main scanning and the sub-scanning may be alternately repeated.

1. Recording Method

A recording method of the present embodiment is a method including: a white ink attachment step of ejecting a white ink composition containing a white coloring material from a white ink jet head and attaching the white ink composition to a recording medium; a non-white ink attachment step of ejecting a non-white ink composition containing a non-white coloring material from a non-white ink jet head and attaching the non-white ink composition to the recording medium; and a primary drying step of heating the white ink composition and the non-white ink composition attached to the recording medium by a drying mechanism. In the white ink attachment step and the non-white ink attachment step, a layer containing the white ink composition and the non-white ink composition is formed by performing main scanning multiple times, in which the ink compositions are ejected and attached to the recording medium, and by attaching the white ink composition and the non-white ink composition to the same scanning region in the recording medium by the same main scanning, while moving a position of an ink jet head relative to the recording medium.

In the related art, a high-quality image has been recorded by forming a white ink layer and a non-white ink layer in an overlapped manner, and using the white ink layer as a concealing layer.

On the contrary, in the present embodiment, the white ink composition and the non-white ink composition are attached to the same scanning region in the recording medium by the same relative scanning. As a result, a single ink layer containing the white ink composition and the non-white ink composition can be formed on the recording medium, and it has been found that even if the white ink layer and the non-white ink layer are not formed in an overlapped manner as in the related art, an image having an excellent color developing property without shade unevenness or the like is formed.

On the other hand, when the white ink composition and the non-white ink composition are attached to the same scanning region in the recording medium by the same relative scanning, an amount of ink attached simultaneously to the same region increases. Therefore, colors of droplets of the respective ink compositions are mixed on the recording medium, such that there are problems that shade unevenness or the like easily occurs, and a color developing property is also easily deteriorated. Particularly, the problems easily occur in low-absorbent recording medium or a non-absorbent recording medium because of a residue of the ink composition on the recording medium.

On the contrary, in the recording method of the present embodiment, the primary drying step is performed, such that ink droplets attached to the recording medium are quickly dried to prevent flow of the ink droplets at an early stage and to prevent deterioration of the image quality as described above.

In the present embodiment, since the white ink layer and the non-white ink layer are not required to be formed in an overlapped manner, it is possible to further improve a printing speed.

Furthermore, a head can have a configuration in which nozzles ejecting the white ink composition and nozzles ejecting the non-white ink composition are arranged side by side, so that the white ink composition and the non-white ink composition are attached to the same scanning region in the recording medium by the same relative scanning. Therefore, it is possible to reduce the overall size of the ink jet head as compared with the head configuration premised on the stacking in the related art.

1.1. White Ink Attachment Step and Non-White Ink Attachment Step

A white ink attachment step is a step of ejecting a white ink composition containing a white coloring material from a white ink jet head and attaching the white ink composition to a recording medium, and a non-white ink attachment step is a step of ejecting a non-white ink composition containing a non-white coloring material from a non-white ink jet head and attaching the non-white ink composition to the recording medium. The white ink composition and the non-white ink composition may be ejected by the same ink jet head. That is, the white ink jet head and the non-white ink jet head may be separated from each other or integrated with each other.

In the recording method of the present embodiment, the white ink composition and the non-white ink composition are attached by relative scanning of a recording head and the recording medium, and the white ink composition and the non-white ink composition are attached to the same scanning region in the recording medium by the same relative scanning.

Here, the same relative scanning means, for example, in a case of a serial type ink jet recording device, one scanning in which the recording head relatively moves in a main scanning direction intersecting a transport direction of the recording medium. The scanning may be relative scanning, scanning performed by moving the recording head relative to the recording medium, or scanning performed by moving the recording medium relative to the recording head. The scanning is performed while ejecting the ink from the recording head to the recording medium.

For example, in the serial type ink jet recording device, when the recording head reciprocates in the same region in the recording medium in the main scanning direction and performs scanning multiple times, one of forward or backward paths of the scanning is defined as one scanning. Therefore, the fact that the white ink attachment step and the non-white ink attachment step are performed by the same relative scanning means that both steps are performed during one scanning of the recording head.

Moreover, the fact that each of the ink compositions is attached to the same scanning region in the recording medium means that the white ink composition and the non-white ink composition are attached to a region where the scanning passes. As a result, a single ink layer containing the white ink composition and the non-white ink composition can be formed on the recording medium.

The white ink recording head and the non-white ink recording head perform scanning at the same time. In this scanning (same scanning), the white ink composition and the non-white ink composition are attached to the same scanning region. The scanning region of the scanning is a region in the recording medium where the recording head performs scanning by the scanning. In the serial type ink jet recording device, the scanning region of the scanning is a portion on the recording medium in which the recording head moves relative to the recording medium by the scanning.

The fact that white ink and non-white ink are attached to the same scanning region in the recording medium by the same relative scanning means that a region scanned by the recording head of the white ink and a region scanned by the recording head of the non-white ink have the same region (overlapping region) in the same scanning. The scanning regions may have at least a part of the same region.

Consequently, it is possible to form a layer containing the white ink composition and the non-white ink composition by the same main scanning. The ink layer is formed by the same main scanning, such that the white ink composition and the non-white ink composition can be uniformly mixed in the ink layer.

In the recording method of the present embodiment, it is preferable to perform the main scanning multiple times on the same region in the recording medium. That is, it is preferable that after the layer containing the white ink composition and the non-white ink composition is attached to a region on the recording medium by certain main scanning, and a layer containing the white ink composition and the non-white ink composition is attached to the region on the recording medium by separate main scanning in an overlapped manner. In this case, the main scanning for attaching the white ink composition and the non-white ink composition passes over the same scanning region multiple times. As the number of scanning increases, the ink can be attached to a desired region in multiple times (multiple passes), and an image quality of the obtained recorded material tends to be improved.

When recording is performed on any region, the number of times the ink jet head passes over the region is referred to as "pass". For example, when the main scanning for attaching the white ink composition and the non-white ink composition is performed four times on the same scanning region, the number of passes is four passes and the like. For example, in an example of FIG. 2, when a length of one sub-scanning in the sub-scanning direction is one fourth of a length of a nozzle row N1 in the sub-scanning direction, scanning is performed four times on a rectangular scanning region that extends in the main scanning direction and extends by the length of one sub-scanning in the sub-scanning direction. The number of scanning when viewed in this way is referred to as the number of scanning, the number of passes, and the like.

The number of scanning is one or more, preferably two or more, more preferably three or more, still more preferably four or more, and particularly preferably eight or more. An upper limit thereof is not limited, and preferably 24 or less, and more preferably 12 or less. As the number of scanning increases, the ink can be attached to the rectangular region, thus making the image quality excellent, which is preferable.

Since the less the number of passes, the more dots are applied per pass, there is a problem that shade unevenness easily occurs. Whereas, since a recording speed tends to be faster, the present disclosure, which can prevent the shade unevenness, is particularly useful.

A ratio of an attachment amount of the white ink composition to 100% by mass of an attachment amount of the non-white ink composition is defined as a ratio A, in a region having the largest attachment amount of the non-white ink composition, among the regions in the recording medium where the white ink composition and the non-white ink composition are attached. The ratio of the attachment amount indicates a ratio of "attachment amount of white ink composition/attachment amount of non-white ink composition". If the attachment amounts of both are equal, the ratio of the attachment amount is 100% by mass.

The ratio A is preferably 80% by mass or less, more preferably 5% to 75% by mass, still more preferably 10% to 70% by mass, and yet still more preferably 35% to 65% by mass. When the ratio A is 80% by mass or less, the color developing property is improved, and the shade unevenness tends to be reduced. Further, when the ratio A is 10% by mass or more, visibility tends to be improved. A unit region for defining the attachment amount is a region having a predetermined area, and may be, for example, a region of 2×2 mm.

Furthermore, supposing that the attachment amount of the non-white ink composition in a region in which the attachment amount of the non-white ink composition is largest among regions where the white ink composition and the non-white ink composition are attached is the maximum application amount B of non-white ink, the ratio of attachment amounts is preferably in the above range from a region in which the attachment amount of the non-white ink composition is the maximum application amount B of non-white ink to a region in which the attachment amount of the non-white ink composition is 40% by mass of the maximum application amount B of non-white ink among the regions where the white ink composition and the non-white ink composition are attached.

Among the regions where the white ink composition and the non-white ink composition are attached, a region in which the attachment amount of the non-white ink is less than 40% by mass of the maximum attachment amount B of the non-white ink composition is a region in which a color of an image of the non-white ink composition has a relatively light, and is originally a region in which superiority or inferiority of the image quality is inconspicuous. In the region, the ratio of the attachment amount may be within, exceed, or be less than the above range. When giving priority to the image quality (OD value), the ratio of the attachment amount may be within or less than the above range. When giving priority to the image quality (visibility), the ratio of the attachment amount may be within or exceed the above range.

The maximum attachment amount of the white ink composition in the regions of the recording medium where the white ink composition and the non-white ink composition are attached is preferably 10 mg/inch$^2$ or less, more preferably 7.5 mg/inch$^2$ or less, and still more preferably 6.0 mg/inch$^2$ or less.

A lower limit of the maximum attachment amount of the white ink composition is preferably 0.50 mg/inch$^2$ or more, more preferably 1.0 mg/inch$^2$ or more, and still more preferably 3.0 mg/inch$^2$ or more, and particularly preferably 5.0 mg/inch$^2$ or more.

The maximum attachment amount of the non-white ink composition may be an attachment amount according to an image to be recorded, unless otherwise specified, but the ratio A is preferably in the preferable range.

As a result, the obtained image can be prevented from becoming too whitish, and the visibility or the color developing property tends to be improved.

1.2. Ink Composition

The white ink composition used in the present embodiment contains a white coloring material, and the non-white ink composition contains a non-white coloring material. Each of the white ink composition and the non-white ink composition may be an aqueous ink composition using water as a main solvent or a solvent-based ink composition using an organic solvent as a main solvent. Hereinafter, components of the ink composition will be described by taking the aqueous ink composition as an example, but the components constituting the ink composition of the present embodiment are not limited to the following.

The white ink composition and the non-white ink composition used in the present embodiment may be solvent-based ink or aqueous ink, but each of them is preferably the aqueous ink. The aqueous ink has a high environmental response in that a content of the organic solvent is relatively smaller than the solvent-based ink. On the other hand, in the aqueous ink, the white ink and the non-white ink are easily mixed, and the color developing property is easily deteriorated and the shade unevenness easily occurs, and in particular, the obtained image tends to be whitish. Therefore, the present disclosure is particularly useful. The "aqueous" as used for "aqueous" ink means that at least water is contained as a main solvent component. A content of water contained in ink or the like is 40% by mass or more, and preferably 50% by mass or more. It is still more preferably 60% to 98% by mass.

The nonaqueous ink contains an organic solvent as a main solvent component. A content of the organic solvent in nonaqueous ink is preferably 40% by mass or more, and more preferably 50% to 98% by mass. A content of water in the nonaqueous ink is preferably 1% by mass or less, and more preferably 0.5% by mass or less. The components other than the solvent component of the nonaqueous ink may be the same as the components that may be contained in the aqueous ink to be described below.

In a case of the aqueous ink composition, the white ink composition and the non-white ink composition may contain water, an organic solvent, a surfactant, resin particles, wax, and the like, if necessary, in addition to the coloring material described above. Hereinafter, each component of the ink composition will be described in detail by taking the aqueous ink as an example.

1.2.1. White Coloring Material

Examples of the white coloring material include, but not limited to, white inorganic pigments such as C. I. Pigment White 6, 18, and 21, silica, alumina, titanium dioxide, zinc oxide, antimony oxide, magnesium oxide, zirconium oxide, zinc sulfide, barium sulfate, and calcium carbonate. In addition to the white inorganic pigment, white organic pigments such as white hollow resin particles and polymer particles can also be used.

Among the above-described white coloring materials, titanium dioxide is preferably used in terms of good whiteness and the like. The white coloring material may be used alone or in combination of two or more.

The content of the white coloring material is preferably 5.0% by mass or more, more preferably 8.0% by mass or more, and still more preferably 10% by mass or more, based on the total amount of the white ink composition. In addition, the content of the white coloring material is preferably 20% by mass or less, more preferably 16% by mass or less, and still more preferably 14% by mass or less, based on the total amount of the white ink composition. It is yet still more preferably 13% by mass or less.

When the content of the white coloring material is within the above range, a higher image quality can be obtained.

It is preferable that the white coloring material can be stably dispersed in the dispersion medium, and therefore, a dispersant may be used to disperse the white coloring material. Examples of the dispersant include a resin dispersant, and the dispersant is selected from those capable of improving dispersion stability of the white coloring material in the white ink composition containing the white coloring material. In addition, the white coloring material may be used as a self-dispersion type pigment by modifying a surface of a pigment particle by oxidizing or sulfonating the surface of the pigment with, for example, ozone, hypochlorous acid, fuming sulfuric acid, or the like.

1.2.2. Non-White Coloring Material

The non-white coloring material is not particularly limited as long as it is a coloring material other than the white coloring material described above, and examples thereof include inorganic pigments such as carbon black (C. I. Pigment Black 7) such as furnace black, lamp black, acetylene black, and channel black; and organic pigments such as quinacridone-based pigments, quinacridonequinone-based pigments, dioxazine-based pigments, phthalocyanine-based pigments, anthrapyrimidine-based pigments, anthanthrone-based pigments, indanthrone-based pigments, flavanthrone-based pigments, perylene-based pigments, diketopyrrolopyrrole-based pigments, perinone-based pigments, quinophthalone-based pigments, anthraquinone-based pigments, thioindigo-based pigments, benzimidazolone-based pigments, isoindolinone-based pigments, azomethine-based pigments, and azo-based pigments. The non-white coloring material may be used alone or in combination of two or more.

A content of the non-white coloring material is preferably 0.5% to 10% by mass, more preferably 0.5% to 7.5% by mass, and still more preferably 1.0% to 6.0% by mass, based on the total amount of the non-white ink composition. It is yet still more preferably 1.5% to 4.0% by mass.

When the content of the non-white coloring material is within the above range, the color developing property or visibility can be improved, and a higher image quality can be obtained.

It is preferable that the non-white coloring material can be stably dispersed in the dispersion medium, and therefore, a dispersant may be used to disperse the non-white coloring material. Examples of the dispersant include a resin dispersant, and the dispersant is selected from those capable of improving dispersion stability of the non-white coloring material in the non-white ink composition containing the non-white coloring material. In addition, the non-white coloring material may be used as a self-dispersion type pigment by modifying a surface of a pigment particle by oxidizing or sulfonating the surface of the pigment with, for example, ozone, hypochlorous acid, fuming sulfuric acid, or the like.

Examples of the non-white ink composition containing the non-white coloring material include, but are not limited to, cyan ink, yellow ink, magenta ink, and black ink.

1.2.3. Water

A content of water is preferably 40% to 98% by mass, based on the total amount of the ink composition. Further, it is more preferably 50% to 85% by mass, still more preferably 55% to 80% by mass, and yet still more preferably 60% to 75% by mass.

1.2.4. Organic Solvent

The organic solvent is not particularly limited as long as it is a water-soluble organic solvent, but examples thereof include triol or higher polyols such as glycerol; glycols such as ethylene glycol, diethylene glycol, triethylene glycol, propylene glycol, dipropylene glycol, 1,3-propanediol, 1,2-butanediol, 1,3-butanediol, 1,2-pentanediol, 1,2-hexanediol, 1,4-butanediol, 1,5-pentanediol, and 1,6-hexanediol; glycol ethers such as ethylene glycol monomethyl ether, ethylene glycol monoethyl ether, diethylene glycol monomethyl ether, diethylene glycol monoethyl ether, propylene glycol monomethyl ether, propylene glycol monoethyl ether, dipropylene glycol monomethyl ether, dipropylene glycol monoethyl ether, triethylene glycol monomethyl ether, and triethylene glycol monobutyl ether; nitrogen-containing solvents such as 2-pyrrolidone, N-methyl-2-pyrrolidone, and N-ethyl-2-pyrrolidone; and alcohols such as methanol, ethanol, n-propyl alcohol, iso-propyl alcohol, n-butanol, 2-butanol, tert-butanol, iso-butanol, n-pentanol, 2-pentanol, 3-pentanol, and tert-pentanol. The organic solvent may be used alone or in combination of two or more.

Glycols are compounds having two hydroxyl groups in the molecule. Examples of glycols include alkanediol in which alkane is substituted with two hydroxyl groups, and a condensate in which the hydroxyl groups of two or more molecules of the alkanediol are condensed between molecules.

The number of carbons in the molecule of the glycols is preferably 2 to 10, more preferably 3 to 8, still more preferably 3 to 6, and particularly preferably 3 to 5.

As the glycols, for example, propylene glycol, 1,2-butanediol, 1,3-butanediol, 1,5-pentanediol, and 1,2-hexanediol are preferable. Examples of the alkanediol include 1,2-alkanediol and both-end-type alkanediol, which are preferable.

Examples of the nitrogen-containing solvent include amide solvents. Examples of the amide solvent include noncyclic amides and cyclic amides.

Examples of the cyclic amides include lactams, pyrrolidones such as 2-pyrrolidone, 1-methyl-2-pyrrolidone, 1-ethyl-2-pyrrolidone, 1-propyl-2-pyrrolidone, and 1-butyl-2-pyrrolidone, N-methyl-ε-caprolactam, N-cyclohexyl-2-pyrrolidone, and β-propiolactam.

Examples of the noncyclic amides include alkoxyalkylamides such as 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, and 3-tert-butoxy-N,N-methylethylpropionamide, N,N-dimethylacetoacetamide, N,N-diethylacetoacetamide, N-methylacetoacetamide, N,N-dimethylisobutyric acid amide, N,N-dimethylformamide, N,N-diethylformamide, N,N-dimethylacetamide, N,N-diethylacetamide, and N,N-dimethylpropionamide.

The triol or higher polyols are compounds having three or more hydroxyl groups in the molecule, and examples thereof include glycerol.

The glycol ethers are compounds obtained by etherification of one or two hydroxyl groups of alkanediol in which alkane is substituted with two hydroxyl groups or a condensate in which the hydroxyl groups of two or more molecules of the alkanediol are condensed between molecules. The etherification is monoetherification or dietherification. The etherification is preferably alkyl etherification. The glycol ethers are compounds with one hydroxyl group in the molecule or without a hydroxyl group. Examples of glycol ethers include those described above.

The alcohols are compounds in which alkanes are substituted with one hydroxyl group, and have one hydroxyl group in the molecule. Examples of alcohols include those described above.

By using such an organic solvent, ejection stability of the ink or rub resistance of the obtained recorded material is improved, and the shade unevenness tends to be reduced.

A content of the organic solvent is preferably 40% by mass or less, based on the total amount of the ink composition. Further, it is more preferably 30% by mass or less, still more preferably 5.0% to 27.5% by mass, and yet still more preferably 10% to 25% by mass. It is even still more preferably 15% to 22% by mass. On the other hand, it is preferably 20% to 33% by mass.

The content of the organic solvent of glycols may be in the above range.

A content of the nitrogen-containing solvent is preferably 40% by mass or less, more preferably 10% by mass or less, still more preferably 5% by mass or less, and particularly preferably 2% by mass or less, based on the total amount of the ink composition. A lower limit of the nitrogen-containing solvent is 0% by mass or more.

When the content of the organic solvent is within the above range, the rub resistance of the obtained recorded material is improved, and the shade unevenness is reduced, such that the recording speed tends to be increased. It is preferable that the content of the nitrogen-containing solvent is equal to or less than the above range in terms of more excellent image quality, the rub resistance, or the like.

A standard boiling point of the organic solvent is preferably 280° C. or lower. It is more preferably 150° C. to 280° C., still more preferably 160° C. to 270° C., and yet still more preferably 170° C. to 260° C. It is even still more preferably 180° C. to 200° C., and even still more further preferably 190° C. or higher and lower than 200° C.

When the standard boiling point of the organic solvent is within the above range, the rub resistance is improved, and the shade unevenness tends to be reduced.

Among the organic solvents contained in the white ink composition or the non-white ink composition, the content of the organic solvent having a standard boiling point of lower than 200° C. is 0% by mass or more, preferably 40% by mass or more, more preferably 50% by mass or more, still more preferably 55% by mass or more, yet still more preferably 60% by mass or more, and even still more preferably 70% by mass or more, based on the total amount of the organic solvent. In addition, an upper limit of the content of the organic solvent having a standard boiling point of lower than 200° C. is preferably 100% by mass or less, more preferably 95% by mass or less, still more preferably 90% by mass or less, and yet still more preferably 70% by mass or less.

Particularly, among the organic solvents contained in the white ink composition, the content of the organic solvent having the standard boiling point of lower than 200° C. is preferably within the above range. When the content of the organic solvent having the standard boiling point of lower than 200° C. is within the above range, the rub resistance is improved, and the shade unevenness tends to be reduced.

Among the organic solvents contained in the white ink composition or the non-white ink composition, the content of the organic solvent having the standard boiling point of 200° C. or higher is 100% by mass or less, preferably 60% by mass or less, more preferably 50% by mass or less, still more preferably 45% by mass or less, yet still more preferably 40% by mass or less, and even still more preferably 30% by mass or less, based on the total amount of the organic solvent. In addition, a lower limit of the content of the organic solvent having the standard boiling point of 200° C. or higher is 0% by mass or more, and preferably 5% by mass or more, and may be 10% by mass or more. When the content of the organic solvent having the standard boiling point of 200° C. or higher is within the above range, the rub resistance is improved, and the shade unevenness tends to be reduced.

The white ink composition or the non-white ink composition preferably contains an organic solvent having the standard boiling point in the above range as an organic solvent of glycols.

The white ink composition or the non-white ink composition preferably contains both the organic solvent having the standard boiling point of lower than 200° C. and the organic solvent having the standard boiling point of 200° C. or higher. By adopting such a solvent composition, the rub resistance is improved, and the shade unevenness tends to be reduced.

The organic solvent having the standard boiling point of lower than 200° C. and the organic solvent having the standard boiling point of 200° C. or higher are preferably the organic solvent of glycols.

A maximum value of a standard boiling point of the organic solvent contained in the white ink composition or the non-white ink composition is preferably 280° C. or lower, more preferably 250° C. or lower, still more preferably 240° C. or lower, and yet still more preferably 230° C. or lower. In addition, the maximum value of the standard boiling point of the organic solvent is preferably 150° C. or higher, and more preferably 160° C. or higher. Particularly, the maximum value of the standard boiling point of the organic solvent contained in the white ink composition is preferably within the above range. When the maximum value of the standard boiling point is within the above range, the rub resistance is improved, and the shade unevenness tends to be reduced.

Particularly, each of the white ink composition and the non-white ink composition is aqueous ink composition, and it is preferable that the organic solvent of glycols having the standard boiling point of exceeding 280° C. or the organic solvent of triol or higher polyols is not contained in an amount of exceeding 2% by mass. The expression "not contained in an amount of exceeding 2% by mass" means that it may be contained in an amount of 0% by mass or in a range of not exceeding 2% by mass. More preferably, the above range does not exceed 1% by mass, and still more preferably, does not exceed 0.5% by mass. The content of the organic solvent, which is not limited to the organic solvent of glycols or the organic solvent of triol or higher polyols, is also preferably within the above range.

1.2.5. Surfactant

Examples of the surfactant include, but not particularly limited to, an acetylene glycol-based surfactant, a fluorine-based surfactant, and a silicone-based surfactant. Among them, the silicone-based surfactant is preferable. As a result, the shade unevenness of the obtained recorded material tends to be prevented.

Examples of the acetylene glycol-based surfactant are preferably, but not particularly limited to, one or more selected from an alkylene oxide adduct of 2,4,7,9-tetramethyl-5-decyne-4,7-diol and 2,4,7,9-tetramethyl-5-decyne-4,7-diol, and an alkylene oxide adduct of 2,4-dimethyl-5-decyne-4-ol and 2,4-dimethyl-5-decyne-4-ol.

Examples of the fluorine-based surfactant include, but not particularly limited to, perfluoroalkyl sulfonate, perfluoroalkyl carboxylate, perfluoroalkyl phosphate, a perfluoroalkyl ethylene oxide adduct, perfluoroalkyl betaine, and a perfluoroalkylamine oxide compound.

Examples of the silicone-based surfactant include a polysiloxane-based compound, polyether-modified organosiloxane, and the like.

A content of the surfactant is preferably 0.1% to 4.0% by mass, more preferably 0.3% to 3.0% by mass, and still more preferably 0.5% to 2.0% by mass, based on the total amount of the ink composition. As a result, the shade unevenness of the obtained recorded material tends to be prevented.

1.2.6. Resin Particles

Resin particles are used to improve the rub resistance of the obtained image. Examples of the resin particles include, but not particularly limited to, resin particles made of a urethane-based resin, an acrylic-based resin (including styrene-acrylic-based resin), a fluorene-based resin, a polyolefin-based resin, a rosin-modified resin, a terpene-based resin, a polyester-based resin, a polyamide-based resin, an epoxy-based resin, a vinyl chloride-based resin, a vinyl chloride-vinyl acetate copolymer, an ethylene vinyl acetate resin, and the like. The resin particles may be in the form of an emulsion.

Among them, the resin particles are preferably the urethane-based resin, the acrylic-based resin, and the polyolefin-based resin. These resin particles are often handled in a form of an emulsion, but may be in a form of powder. In addition, the resin particles can be used alone or in combination of two or more.

The urethane-based resin is a general term for a resin having a urethane bond. In addition to the urethane bond, a polyether-type urethane resin whose main chain has an ether bond, a polyester-type urethane resin whose main chain has an ester bond, a polycarbonate-type urethane resin whose main chain has a carbonate bond may be used as the urethane-based resin.

The acrylic-based resin is a general term for a polymer obtained by polymerizing acrylic-based monomers such as at least (meth)acrylic acid and (meth)acrylic acid ester as one component, and examples thereof include a resin obtained from the acrylic-based monomer and a copolymer of the acrylic-based monomer and other monomers. Examples thereof include an acrylic-vinyl-based resin which is a copolymer of the acrylic-based monomer and a vinyl-based monomer. In addition, examples of the vinyl-based monomer include styrene. As the acrylic-based monomer, acrylamide, acrylonitrile, and the like can also be used.

Among them, the styrene-acrylic-based resin is preferable. Examples of the styrene-acrylic-based resin include, but not particularly limited to, a styrene-acrylic acid copolymer, a styrene-methacrylic acid copolymer, a styrene-methacrylic acid-acrylic acid ester copolymer, a styrene-α-methylstyrene-acrylic acid copolymer, a styrene-α-methylstyrene-acrylic acid-acrylic acid ester copolymer, and the like. By using such a resin, the image quality or rub resistance of the obtained recorded material tends to be improved.

The polyolefin-based resin has an olefin such as ethylene, propylene, or butylene in a structural skeleton thereof, and it is possible to appropriately select and use known resins.

A content of the resin particles is preferably 0.5% to 15% by mass, more preferably 1.0% to 10% by mass, and still more preferably 2.5% to 7.5% by mass, based on the total amount of the ink composition. When the content of the resin particles is within the above range, the rub resistance of the obtained recorded material tends to be improved.

1.2.7. Wax

Examples of wax include, but not particularly limited to, plant/animal waxes such as carnauba wax, candelilla wax, beeswax, rice wax, and lanolin; petroleum waxes such as paraffin wax, microcrystalline wax, polyethylene wax, polyethylene oxide wax, and petrolatum; mineral waxes such as montan wax and ozokerite; synthetic waxes such as carbon wax, Hoechst wax, polyolefin wax, and stearic acid amide; natural/synthetic wax emulsions such as α-olefin-maleic anhydride copolymers; and blend waxes. The wax may be used alone or in combination of two or more. The wax may be an emulsion.

Among them, it is preferable to use the polyolefin wax (particularly polyethylene wax, polypropylene wax) and the paraffin wax. By using such a wax, the rub resistance of the obtained recorded material tends to be improved.

A content of the wax is preferably 0.1% to 7.5% by mass, more preferably 0.3% to 5.0% by mass, and still more preferably 0.5% to 2.5% by mass, based on the total amount of the ink composition. When the content of the wax is within the above range, the rub resistance of the obtained recorded material tends to be improved.

1.2.8. Other Components

The ink composition may further contain components such as an antimicrobial/preservative agent, a rust inhibitor, a chelating agent, a viscosity modifier, and an antioxidant, if necessary.

1.3. Primary Drying Step

A primary drying step is a step of drying the white ink composition and the non-white ink composition attached to the recording medium by a drying mechanism at an early stage. Particularly, the primary drying step means drying a region where the white ink composition and the non-white ink composition are attached at an early stage, in the white ink attachment step and the non-white ink attachment step.

The primary drying step is a step of drying the ink attached to the recording medium at an early stage. The primary drying step is a step for drying at least a part of a solvent component in the ink to an extent that the ink attached to the recording medium is reduced not to at least flow. In the primary drying step, the ink composition may be attached to the heated recording medium, or the ink composition may be dried at a position of the recording medium facing the ink jet head, or the ink composition may be dried at an early stage after the attachment. In the primary drying step, drying of ink droplets attached to the recording medium is preferably started within 0.5 seconds from the attachment of the ink droplets.

Examples of the drying mechanism in the primary drying step include, but not particularly limited to, a conductive type heated by a platen heater, a pre-heater, and the like, a radiation type heated by an IR heater, and the like, and an air blowing type (air) using an air blowing fan, and the like. The air removes the evaporated solvent component from the media, thus promoting evaporation and obtaining an excellent image quality. Air from the air blowing type is not limited to warm air, but may be normal temperature air. The normal temperature air does not affect the nozzle with heat, which is preferable.

The drying mechanism is also referred to as a drying unit. The drying unit may be used alone or in combination of two or more. Particularly, as the drying unit, preferably, either the conductive type or the radiation type, and the air blowing type are used, and more preferably, the conductive type and the air blowing type are used. In this case, heating can be performed by the conductive type or the radiation type, and evaporation can be promoted by the air blowing type, such that the excellent image quality can be obtained. In this case, the blowing air from the air blowing type may be warm air or normal temperature air, but the normal temperature air is preferable in terms of excellent ejection stability.

An air velocity in the air blowing is preferably 0.5 to 5 m/s, more preferably 0.5 to 4 m/s, and still more preferably 0.5 to 3 m/s. When the air velocity in the air blowing is within the above range, the air can remove the solvent component evaporated from the media to promote the evaporation, and there is a tendency that ejection bending by the air hardly occurs. The air velocity is an air velocity in the vicinity of the recording medium.

Air in the air blowing may be normal temperature air or warm air, and the air temperature is preferably 10° C. to 50° C., more preferably 15° C. to 45° C., still more preferably 20° C. to 40° C., and particularly preferably 25° C. to 30° C. When the air temperature in the air blowing is within the above range, the evaporation of the ink can be promoted, and the ejection stability is excellent, which is preferable.

A surface temperature of the recording medium in the primary drying step is preferably 25° C. or higher. In addition, it is preferably 60° C. or lower. It is more preferably 30° C. to 50° C., still more preferably 35° C. to 45° C., and yet still more preferably 40° C. to 45° C. Alternatively, it is preferably 30° C. to 40° C., and more preferably 30° C. to 35° C.

The surface temperature of the recording medium in the primary drying step is a maximum temperature during recording.

When the surface temperature of the recording medium in the primary drying step is within the above range, the rub resistance or the visibility is improved, and the shade unevenness tends to be prevented.

1.4. Secondary Drying Step

The recording method of the present embodiment may include a secondary drying step for the purpose of further drying the recorded material after the primary drying step. The secondary drying step refers to sufficiently drying the recording medium where the ink composition is attached to an extent that the recorded material can be used, and refers to drying performed to complete the recording. The secondary drying may include heating for flattening a component such as a resin contained in the ink composition. After all the ink attached to a certain region in the recording medium is attached, the heating is preferably started in more than 0.5 seconds from the completion of the attachment.

The secondary drying step is also referred to as a post-drying step. Heating is preferably used as the secondary drying step. A surface temperature of the recording medium in the secondary drying step is preferably 50° C. to 120° C., more preferably 50° C. to 100° C., and still more preferably 60° C. to 90° C.

Examples of a drying method in the secondary drying step include, but not particularly limited to, a conductive type such as a platen heater and a pre-heater, a radiation type such as an IR heater, and an air blowing type such as an air blowing fan.

1.5. Recording Medium

Examples of the recording medium used in the present embodiment include, but not particularly limited to, an absorbent recording medium such as paper, film, and cloth, a low-absorbent recording medium such as printing paper, and a non-absorbent recording medium such as metal, glass, and polymer.

Among these, the low-absorbent recording medium or the non-absorbent recording medium is preferable in terms of ink absorbency. In addition, the non-white recording medium is preferable in terms of color. In the related art, such a recording medium has recorded a high-quality image by forming a white ink layer and a non-white ink layer in an overlapped manner, and using the white ink layer as a concealing layer. Therefore, the present disclosure is used, thereby particularly effectively exhibiting an effect of the present disclosure of forming an image having an excellent color developing property without shade unevenness or the like.

In the present embodiment, the non-absorbent or low-absorbent recording medium refers to a "recording medium whose an amount of water absorption from the start of contact to 30 msec$^{1/2}$ in a Bristow's method is 10 mL/m$^2$ or less". The Bristow's method is the most common method as a method of measuring the amount of liquid absorption in a short period of time and is also employed in Japan Technical Association of the Pulp and Paper Industry (JAPAN TAPPI). The details of a test method are described in Standard No. 51, "Paper and Paperboard-Liquid Absorption Test Method-Bristow's method" of "JAPAN TAPPI Paper Pulp Test Methods, 2000 version".

Examples of the non-absorbent recording medium include a medium in which plastic is coated on a base material such as paper, a medium in which a plastic film adheres to the base material such as paper, and a plastic film without an absorption layer (receiving layer). Examples of the plastic referred to herein include polyvinyl chloride, polyethylene terephthalate, polycarbonate, polystyrene, polyurethane, polyethylene, polypropylene, and the like.

Examples of the low-absorbent recording medium include recording media having a low-absorbent coated layer disposed on a surface thereof. For example, the recording medium is called coated paper. For example, examples of the recording medium whose base material is paper include printing paper such as art paper, coated paper, and matte paper. When the base material is a plastic film, examples thereof include recording media in which a polymer and the like is coated onto a surface such as polyvinyl chloride, polyethylene terephthalate, polycarbonate, polystyrene, polyurethane, polyethylene, and polypropylene, and recording media in which particles such as silica and titanium are coated with a binder.

As the recording medium, an absorbent recording medium can also be used. The absorbent recording medium refers to a "recording medium whose an amount of water absorption from the start of contact to 30 msec$^{1/2}$ in a Bristow's method exceeds 10 mL/m$^2$".

Examples of the non-white recording medium include transparent recording media. The transparent recording medium may be colorless transparent, or colored transparent. In addition, transparency also includes translucency. These are recording media with visual translucency. These are also visible light transparent recording media. In such a case, an image formed on one side of the recording medium can be satisfactorily visually recognized from both sides of the recording medium by the recording method of the present embodiment.

Examples of the non-white recording medium include non-white colored recording media. Examples thereof include a non-white colored opaque recording medium and a non-white colored transparent recording medium. Also in this case, the recording method of the present embodiment can easily form an image having good image quality such as visibility, filling property, and reduction of image quality difference. The non-white colored recording medium may be the above-described transparent recording medium, or may not be the transparent recording medium. A recording medium which is not the transparent recording medium is a recording medium without visual translucency. It is also a recording medium that is opaque to visible light. Here, "non-white colored" means having a color other than white.

2. Recording Device

According to the present embodiment, a recording device that performs recording by the recording method includes: a white ink jet head configured to eject a white ink composition containing a white coloring material and attach the white ink composition to a recording medium; a non-white ink jet head configured to eject a non-white ink composition containing a non-white coloring material and attach the non-white ink composition to the recording medium; a drying mechanism configured to dry the white ink composition and the non-white ink composition attached to the recording medium, and a control section configured to perform control of recording by using the white ink jet head and the non-white ink jet head.

Hereinafter, an example of the recording device used in the present embodiment will be described with reference to the drawings, but the recording device used in the present embodiment is not limited to the following aspects.

FIG. 1 illustrates an example of a recording device used in the present embodiment. FIG. 1 illustrates an example of an on-carriage type printer in which an ink cartridge is mounted on a carriage. However, the recording device is not limited to the on-carriage type printer, and may be an off-carriage type printer having the ink cartridge fixed to the outside. In the case of the off-carriage type, an ink cartridge 3 may be mounted in a place other than a carriage 4, and ink may be supplied from the ink cartridge 3 to a recording head 2 via an ink supply tube.

The printer used in the following description is a serial printer in which an ink jet head for recording is mounted on a carriage that moves in a predetermined direction, and the ink jet head moves as the carriage moves to eject droplets onto the recording medium. The serial type may be a type in which main scanning is performed in a direction intersecting a sub-scanning direction which is a feeding direction of the recording medium, or may be a lateral type in which the ink jet head moves relative to the fixed recording medium alternately in the main scanning direction and the sub-scanning direction.

As illustrated in FIG. 1, a printer 1 includes the recording head 2, the ink cartridge 3, the carriage 4, a platen 5, a drying mechanism 6, a carriage moving mechanism 7, a medium feeding mechanism 8, a guide rod 9, a linear encoder 10, and a control section CONT.

The control section CONT controls the entire operation of the printer 1. The carriage 4 is mounted with the recording head 2 to be described below, and detachably mounted with the ink cartridge 3 that supplies each ink composition to the recording head 2. The platen 5 is arranged below the recording head 2, and a recording medium M, which is a recording medium, is transported. The drying mechanism 6 heats the recording medium M. The carriage moving mechanism 7 moves the carriage 4 in a medium width direction of the recording medium M. The medium feeding mechanism 8 transports the recording medium M in a medium feeding direction. The medium width direction herein is a main scanning direction MS, which is an operation direction of the recording head 2. The medium feeding direction, which is a direction orthogonal to the main scanning direction MS, is a sub-scanning direction SS in which the recording medium M moves.

The recording head 2 is a unit that attaches each ink composition to the recording medium M, and includes, on a surface thereof facing the recording medium M to which the ink compositions are attached, a first nozzle ejecting the white ink composition, and the second nozzle ejecting the non-white ink composition. A plurality of nozzles are arranged in a row, whereby a nozzle surface is formed on a surface of a nozzle plate. In FIG. 1, the recording head 2 serves as both the white ink jet head and the non-white ink jet head.

An example of a type of ejecting the white ink composition or the non-white ink composition from the nozzle includes a piezoelectric type in which droplets of the white ink composition or non-white ink composition are ejected or recorded by simultaneously applying a pressure and a recording information signal to the white ink composition or the non-white ink composition with a piezoelectric element. Further, in addition to the ink jet head, a dot impact head, a thermal transfer head, or the like may be used as the recording head 2.

Figure 2:
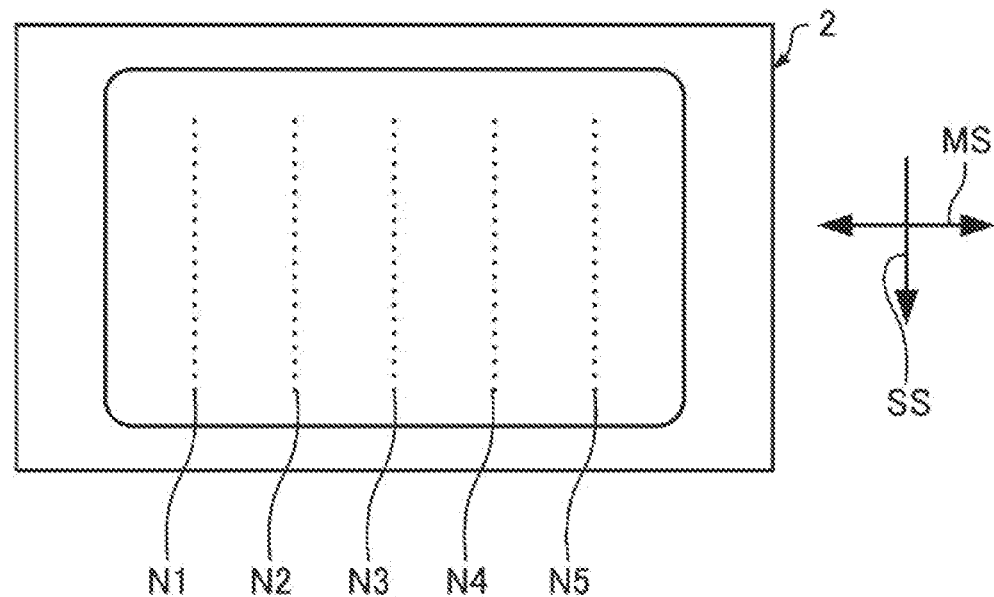
FIG. 2 illustrates an example of a configuration of an ink jet head.

FIG. 2 illustrates a nozzle forming surface when the ink jet head is used as the recording head 2. When scanning is performed by ejecting the white ink composition from a nozzle row N1 and ejecting the non-white ink composition from a nozzle row N2, the nozzle row N1 and the nozzle row N2 have an overlapping portion in the sub-scanning direction SS when the nozzle row N1 and the nozzle row N2 are projected in the main scanning direction MS. In this case, one scan of the ink jet head causes the white ink composition and the non-white ink composition to be attached to the same region in the recording medium.

In a case of the above example, the same region is a portion in which the nozzle row N1 and the nozzle row N2 overlap each other in the sub-scanning direction SS when the nozzle row N1 that ejects white ink and the nozzle row N2 that ejects non-white ink are projected in the main scanning direction MS.

Figure 3:
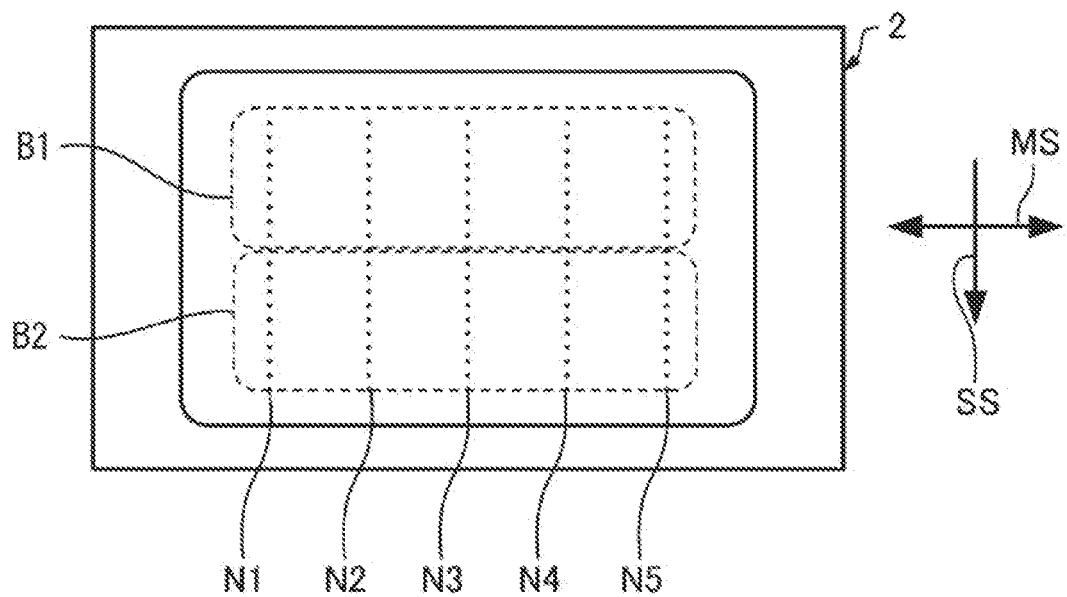
FIG. 3 illustrates an example of a configuration of an ink jet head.

FIG. 3 illustrates another aspect of the ink jet head. The ink jet head illustrated in FIG. 3 is further divided into regions of blocks B1 and B2 in the sub-scanning direction SS. The ink jet head can change a type of droplets to be ejected for each block and each nozzle row. For example, in FIG. 3, the ink jet head may be configured so that the block B1 of the nozzle row N1 ejects the white ink and the blocks B1 and B2 of the nozzle row N2 eject the non-white ink. As such, the ink jet head is further divided into the blocks in the sub-scanning direction SS of the ink jet head, such that it is possible to implement a more flexible ejection mode.

Also in this case, the same main scanning causes the white ink composition and the non-white ink composition to be attached to the same region in the recording medium facing the block B1.

In FIG. 1, the ink cartridge 3 that supplies the white ink composition or the like to the recording head 2 includes four separate cartridges. For example, three of the four cartridges are filled with different types of non-white ink compositions, and one of which is filled with the white ink composition. The ink cartridge 3 is detachably mounted on the recording head 2. In the example of FIG. 1, the number of cartridges is four, but is not limited thereto, and the desired number of cartridges can be mounted.

The carriage 4 is attached to the guide rod 9, which is a support member provided in the main scanning direction, while being supported, and moves in the main scanning direction along the guide rod 9 by the carriage moving mechanism 7. In an example of FIG. 1, the carriage 4 moves in the main scanning direction, but is not limited to this, and may move in the sub-scanning direction in addition to the movement in the main scanning direction.

An installation position of the drying mechanism 6 is not particularly limited as long as it is disposed at a position where the recording medium M can be heated. In an example of FIG. 1, the drying mechanism 6 is installed on the platen 5 and at a position facing the recording head 2. When the drying mechanism 6 is installed at the position facing the recording head 2, the drying mechanism 6 can reliably heat an attachment position of the white ink composition or non-white ink composition in the recording medium M, and efficiently dry the white ink composition or the non-white ink composition attached to the recording medium M.

Examples of the drying mechanism 6 include a print heater mechanism that heats the recording medium M by bringing the recording medium M in contact with a heat source, a mechanism that radiates infrared rays, microwaves that are electromagnetic waves having a maximum wavelength of about 2,450 MHz, a dryer mechanism that blows warm air, and the like.

The heating of the recording medium M by the drying mechanism 6 is performed before, when or immediately after the droplets ejected from the nozzle of the recording head 2 are attached to the recording medium M. The control of various heating conditions, such as a timing of heating, a heating temperature, and a heating time, is performed by the control section CONT.

The linear encoder 10 detects a position of the carriage 4 in the main scanning direction by a signal. The signal detected by the linear encoder 10 is transmitted to the control section CONT as position information. The control section CONT recognizes a scanning position of the recording head 2 based on the position information from the linear encoder 10, and controls a recording operation, that is, an ejection operation and the like by the recording head 2. The control section CONT has a configuration in which a moving speed of the carriage 4 can be variably controlled.

Figure 4:
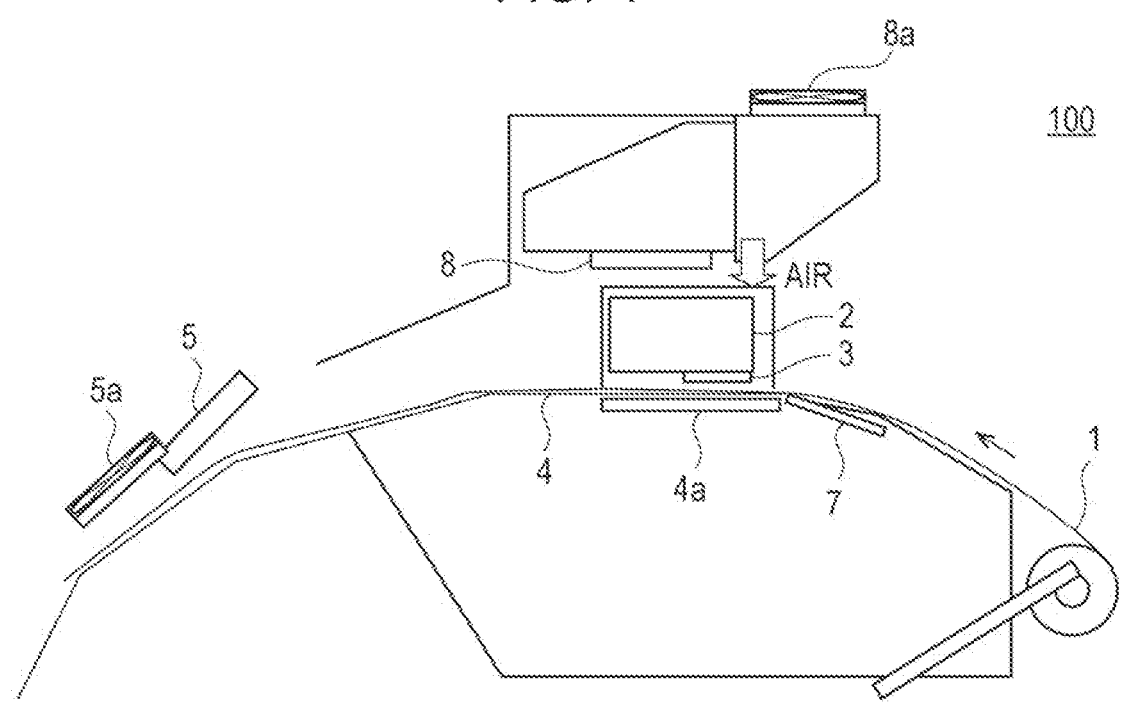
FIG. 4 illustrates an example of a recording device used in the present embodiment.

FIG. 4 is a schematic sectional view illustrating surrounding of the ink jet head of the recording device in FIG. 1 when viewed from the side. FIG. 4 also illustrates a drying mechanism and the like. A recording device 100 includes a carriage 2, an ink jet head 3, a platen 4, a platen heater 4a, a pre-heater 7, an IR heater 8, an air blowing fan 8a, an after-heater 5, and a cooling fan 5a. Recording is performed on a recording medium 1.

As the drying mechanism used in the primary drying step, a conductive type using the platen heater 4a or the pre-heater 7, a radiation type using the IR heater 8, and an air blowing type using the air blowing fan 8a can be used. The primary drying step is performed using at least one of the conductive type, the radiation type, and the air blowing type. The air blowing fan 8a can blow air to the ink attached to the recording medium in the recording medium in the vicinity of the position facing the ink jet head 3 in a transport direction of the recording medium, to promote evaporation of the ink. The after-heater 5 is a drying mechanism used in the secondary drying step.

EXAMPLE

Hereinafter, the present disclosure will be described in more detail with reference to Examples and Comparative Examples. The present disclosure is not limited to the following Examples.

1. Ink Composition

Each material was mixed with a composition shown in the following Table 1 and sufficiently stirred to obtain each ink composition. Specifically, the ink composition was prepared by uniformly mixing each material and removing an insoluble matter with a filter. In Table 1 below, a unit of numerical value is "% by mass", and a total of numerical values is 100.0% by mass. In addition, a solid content is shown unless otherwise specified.

A coloring material was mixed with a dispersant in advance and stirred to prepare a pigment dispersion, which was used for ink preparation. A dispersant resin was used as the dispersant, and a commercially available product suitable for each pigment was mixed in a mass ratio between the pigment and the dispersant of 2:1.

TABLE 1

|  |  | WHITE INK |  |  |  |  |  |  |
|---|---|---|---|---|---|---|---|---|
|  |  | W01 | W02 | W03 | W04 | W05 | W06 | W07 |
| COLORING MATERIAL | TITANIUM DIOXIDE | 10.0 | 10.0 | 10.0 | 10.0 | 10.0 | 10.0 | 10.0 |
|  | RB.15:3 |  |  |  |  |  |  |  |
| FIXING RESIN | STYRENE ACRYLIC RESIN | 5.0 | 5.0 | 5.0 | 5.0 | 5.0 | 5.0 | 5.0 |
| WAX | POLYETHYLENE WAX | 1.0 | 1.0 | 1.0 | 1.0 | 1.0 | 1.0 | 1.0 |
| ORGANIC SOLVENT | PROPYLENE GLYCOL (188° C.) | 15.0 |  |  |  | 11.0 | 14.0 | 12.0 |
|  | 1,2-BUTANEDIOL (193° C.) |  | 15.0 |  |  |  |  |  |
|  | 1,3-BUTANEDIOL (207° C.) | 4.0 | 4.0 | 19.0 | 4.0 | 8.0 | 3.0 | 2.0 |
|  | 1,5-PENTANEDIOL (239° C.) |  |  |  | 15.0 |  |  |  |
|  | GLYCEROL (290° C.) |  |  |  |  |  | 2.0 |  |
|  | 2-PYRROLIDONE (245° C.) |  |  |  |  |  |  | 5.0 |
|  | 1,2-HEXANEDIOL (223° C.) | 4.0 | 4.0 | 4.0 | 4.0 | 4.0 | 4.0 | 4.0 |
| SURFACTANT | BYK348 | 1.0 | 1.0 | 1.0 | 1.0 | 1.0 | 1.0 | 1.0 |
| WATER |  | RESIDUE | RESIDUE | RESIDUE | RESIDUE | RESIDUE | RESIDUE | RESIDUE |
| TOTAL |  | 100 | 100 | 100 | 100 | 100 | 100 | 100 |
| TOTAL AMOUNT OF ORGANIC SOLVENT [% BY MASS] |  | 23.0 | 23.0 | 23.0 | 23.0 | 23.0 | 23.0 | 23.0 |
| CONTENT OF SOLVENT HAVING STANDARD BOILING POINT OF LOWER THAN 200° C. BASED ON TOTAL AMOUNT OF ORGANIC SOLVENT [% BY MASS] |  | 65 | 65 | 0 | 0 | 48 | 61 | 52 |

|  |  | WHITE INK |  |  |  |  | NON-WHITE INK |  |
|---|---|---|---|---|---|---|---|---|
|  |  | W08 | W09 | W10 | W11 | W12 | C01 | C02 |
| COLORING MATERIAL | TITANIUM DIOXIDE | 10.0 | 10.0 | 10.0 | 8.0 | 14.0 |  |  |
|  | RB.15:3 |  |  |  |  |  | 4.0 | 4.0 |
| FIXING RESIN | STYRENE ACRYLIC RESIN | 5.0 | 5.0 | 5.0 | 4.0 | 6.0 | 3.0 | 3.0 |
| WAX | POLYETHYLENE WAX | 1.0 | 1.0 | 1.0 | 1.0 | 1.0 | 1.0 | 1.0 |
| ORGANIC SOLVENT | PROPYLENE GLYCOL (188° C.) | 11.0 | 19.0 | 21.0 | 15.0 | 15.0 | 15.0 |  |
|  | 1,2-BUTANEDIOL (193° C.) |  |  |  |  |  |  |  |
|  | 1,3-BUTANEDIOL (207° C.) | 2.0 |  | 7.0 | 4.0 | 4.0 | 4.0 | 4.0 |
|  | 1,5-PENTANEDIOL (239° C.) |  |  |  |  |  |  | 15.0 |
|  | GLYCEROL (290° C.) |  |  |  |  |  |  |  |
|  | 2-PYRROLIDONE (245° C.) |  |  |  |  |  |  |  |
|  | 1,2-HEXANEDIOL (223° C.) | 4.0 | 4.0 | 4.0 | 4.0 | 4.0 | 4.0 | 4.0 |
| SURFACTANT | BYK348 | 1.0 | 1.0 | 1.0 | 1.0 | 1.0 | 1.0 | 1.0 |
| WATER |  | RESIDUE | RESIDUE | RESIDUE | RESIDUE | RESIDUE | RESIDUE | RESIDUE |
| TOTAL |  | 100 | 100 | 100 | 100 | 100 | 100 | 100 |
| TOTAL AMOUNT OF ORGANIC SOLVENT [% BY MASS] |  | 17.0 | 23.0 | 32.0 | 23.0 | 23.0 | 23.0 | 23.0 |

TABLE 1-continued

| CONTENT OF SOLVENT HAVING STANDARD BOILING POINT OF LOWER THAN 200° C. BASED ON TOTAL AMOUNT OF ORGANIC SOLVENT [% BY MASS] | 65 | 83 | 66 | 65 | 65 | 65 | 0 |
|---|---|---|---|---|---|---|---|

*The value of the organic solvent in parentheses means a standard boiling point.
Styrene acrylic resin: product name JONCRYL 537J, manufactured by BASF
Polyethylene wax: product name AQUACER 539, manufactured by BYK
BYK348: Silicone-based surfactant, manufactured by BYK
2. Evaluation As a recording device, a modified machine of a serial type ink jet printer (trade name: SC-S80650) was prepared. A nozzle density per nozzle row was 360 npi, and the number of nozzles was 360.

In an example in which the recording method is "simultaneous", an ink jet head in which the respective nozzle rows are arranged side by side in the main scanning direction as illustrated in FIG. 2 is used. A resolution at the time of recording was 720×720 dpi.

The number of ink droplets per pixel and an amount of ink droplets were adjusted so that the attachment amount was as the value in the tables at the resolution. The number of ink droplets per pass was also adjusted.

According to the conditions shown in Tables 2 to 4, a recording test was performed using the above-described recording device to obtain a recorded material. Specifically, according to the conditions of Examples for a recording medium (PET50A (transparent film), manufactured by LINTEC Corporation), each ink composition was recorded by a predetermined attachment amount and the number of passes, and a solid image was recorded.

In the example in which the white ink and the non-white ink are attached in a "simultaneous" manner, the first nozzle row of the side-by-side heads was filled with the white ink and the second nozzle row was filled with color ink, and the inks were simultaneously ejected by the number of passes shown in the tables in the same main scanning.

In an example in which the white ink and the non-white ink are attached by "stacking", the white ink jet head was disposed upstream of a color ink jet head in a medium transport direction, and the white ink was printed first with the number of passes shown in Tables 2 to 4, and the color ink was then recorded by the number of passes shown in Tables 2 to 4 in an overlapped manner.

The ink attachment amount is an attachment amount in a 2×2 mm region in a recording pattern.

The recording device was provided with a platen heater and an air blowing fan as in FIG. 4. An air velocity of the air blowing fan was an air velocity in the vicinity of a paper surface, which was a value shown in Tables 2 to 4. The air temperature was a value in the tables. The air temperature was an air temperature in the vicinity of a surface of the recording medium, and was set and measured in advance without being affected by a temperature of the platen heater, and recording was performed under the set conditions.

A heating intensity of the platen heater was adjusted so that the surface temperature of the recording medium was a value in the tables.

Moreover, the secondary drying step was performed using a downstream secondary heater so that the surface temperature of the recording medium was 70° C.

2.1. Rub Resistance

For the recorded material obtained as described above, a cloth was placed on a surface of a coating film with a Gakushin-type color fastness rubbing tester (manufactured by Tester Sangyo Co., Ltd.), and a load of 500 g was applied to the surface and rubbed 50 times back and forth. After the rubbing, peeling or scratches on the surface of the coating film was visually observed, and rub resistance was evaluated based on the following evaluation criteria.

(Evaluation Criteria)
A: No peeling of the image is observed
B: There is peeling of less than 10 area %
C: There is peeling of 10 area % or more and less than 40 area %
D: There is peeling of 40 area % or more 2.2. Ejection Stability Recording was performed continuously for two hours according to the conditions shown in Tables 2 to 4. However, simulation recording in which, after the recording, the ink is not ejected from the ink jet head was performed. After this recording, suction cleaning was performed to discharge the ink of 1 cc, and a nozzle inspection was performed to observe the presence of a non-ejection nozzle. When the non-ejection nozzle was present, the suction cleaning was performed again, the number of times of cleaning was counted until all nozzles are recovered, and ejection stability was evaluated based on the following evaluation criteria.

(Evaluation Criteria)
A: All nozzles are recovered by cleaning once
B: All nozzles are recovered by cleaning two or three times
C: All nozzles are recovered by cleaning four to six times
D: A nozzle does not recover after 6 cleanings 2.3. Image Quality (Shade Unevenness)

A pattern image of the recorded material obtained as described above was visually observed, and shade unevenness of a printed material was evaluated based on the following evaluation criteria.

(Evaluation Criteria)
A: Shade unevenness cannot be observed
B: Some fine shade unevenness is visible
C: Fine shade unevenness is quite visible
D: Large shade unevenness is visible 2.4. Image Quality (Visibility)

The recorded material obtained as described above was placed on black paper, ease of viewing the image was visually observed, and visibility was evaluated based on the following evaluation criteria. When the attachment amount of the white ink was small, concealing properties of the image was not sufficient, blackness of the black paper under the recorded material was seen-through, and the image was difficult to be visually recognized.

(Evaluation Criteria)
A: It is easy to visually recognize
B: It looks a little black, but is easy to be visually recognized
C: It looks black, but is visually recognized D: It looks black and is difficult to be visually recognized E: It looks black and is very difficult to be visually recognized 2.5. Image Quality (OD Value)

For the solid image of the recorded material obtained as described above, an OD value was measured under the following measurement conditions using a colorimeter (i1Pro2, manufactured by X-Rite), and a color developing property was evaluated based on the following evaluation criteria.

(Measurement Condition)

D50 light source, status T, standard observer 2°, background: white paper (Evaluation Criteria)

A: OD value is 1.0 or more

B: OD value is 0.8 or more and less than 1.0

C: OD value is 0.6 or more and less than 0.8

D: OD value is 0.4 or more and less than 0.6

E: OD value is less than 0.4

2.6. Productivity

Productivity was evaluated based on the following evaluation criteria, according to the number of passes that was required for recording on a portion of a recording region of the recording medium in which a length in a transport direction is a length of one sub-scanning.

(Evaluation Criteria)

A: Four passes or less

B: Five or six passes

C: Seven or eight passes

D: Nine passes or more

TABLE 2

|  |  | EXAMPLE | | | |
| --- | --- | --- | --- | --- | --- |
|  |  | 1 | 2 | 3 | 4 |
| WHITE INK ATTACHMENT STEP | TYPE | W01 | W02 | W03 | W04 |
|  | ATTACHMENT AMOUNT mg/inch$^2$ | 3.5 | 3.5 | 3.5 | 3.5 |
| NON-WHITE INK ATTACHMENT STEP | TYPE | C01 | C01 | C01 | C01 |
|  | ATTACHMENT AMOUNT mg/inch$^2$ | 7 | 7 | 7 | 7 |
| RECORDING METHOD | SIMULTANEOUS/STACKING | SIMULTANEOUS | SIMULTANEOUS | SIMULTANEOUS | SIMULTANEOUS |
|  | ATTACHMENT AMOUNT RATIO (WHITE/NON-WHITE) % | 50 | 50 | 50 | 50 |
|  | NUMBER OF PASSES | 8 | 8 | 8 | 8 |
| PRIMARY DRYING STEP | SURFACE TEMPERATURE OF RECORDING MEDIUM (° C.) | 45 | 45 | 45 | 45 |
|  | AIR BLOWING (AIR VELOCITY m/s) | 2 | 2 | 2 | 2 |
|  | AIR TEMPERATURE (° C.) | 25 | 25 | 25 | 25 |
| EVALUATION | IMAGE QUALITY (SHADE UNEVENNESS) | B | B | C | C |
|  | IMAGE QUALITY (VISIBILITY) | B | B | B | B |
|  | IMAGE QUALITY (OD VALUE) | B | B | B | B |
|  | RUB RESISTANCE | A | A | B | C |
|  | EJECTION STABILITY (WHITE) | B | B | A | A |
|  | PRODUCTIVITY | C | C | C | C |
|  |  | EXAMPLE | | | |
|  |  | 5 | 6 | 7 | 8 |
| WHITE INK ATTACHMENT STEP | TYPE | W05 | W06 | W07 | W08 |
|  | ATTACHMENT AMOUNT mg/inch$^2$ | 3.5 | 3.5 | 3.5 | 3.5 |
| NON-WHITE INK ATTACHMENT STEP | TYPE | C01 | C01 | C01 | C01 |
|  | ATTACHMENT AMOUNT mg/inch$^2$ | 7 | 7 | 7 | 7 |
| RECORDING METHOD | SIMULTANEOUS/STACKING | SIMULTANEOUS | SIMULTANEOUS | SIMULTANEOUS | SIMULTANEOUS |
|  | ATTACHMENT AMOUNT RATIO (WHITE/NON-WHITE) % | 50 | 50 | 50 | 50 |
|  | NUMBER OF PASSES | 8 | 8 | 8 | 8 |
| PRIMARY DRYING STEP | SURFACE TEMPERATURE OF RECORDING MEDIUM (° C.) | 45 | 45 | 45 | 45 |
|  | AIR BLOWING (AIR VELOCITY m/s) | 2 | 2 | 2 | 2 |
|  | AIR TEMPERATURE (° C.) | 25 | 25 | 25 | 25 |

TABLE 2-continued

|  |  | | | | |
|---|---|---|---|---|---|
| EVALUATION | IMAGE QUALITY (SHADE UNEVENNESS) | C | C | C | A |
|  | IMAGE QUALITY (VISIBILITY) | B | B | B | B |
|  | IMAGE QUALITY (OD VALUE) | B | B | B | B |
|  | RUB RESISTANCE | A | D | C | A |
|  | EJECTION STABILITY (WHITE) | A | A | A | C |
|  | PRODUCTIVITY | C | C | C | C |

|  |  | EXAMPLE | | | |
|---|---|---|---|---|---|
|  |  | 9 | 10 | 11 | 12 |
| WHITE INK ATTACHMENT STEP | TYPE | W09 | W10 | W11 | W12 |
|  | ATTACHMENT AMOUNT mg/inch$^2$ | 3.5 | 3.5 | 3.5 | 3.5 |
| NON-WHITE INK ATTACHMENT STEP | TYPE | C01 | C01 | C01 | C01 |
|  | ATTACHMENT AMOUNT mg/inch$^2$ | 7 | 7 | 7 | 7 |
| RECORDING METHOD | SIMULTANEOUS/STACKING | SIMULTANEOUS | SIMULTANEOUS | SIMULTANEOUS | SIMULTANEOUS |
|  | ATTACHMENT AMOUNT RATIO (WHITE/NON-WHITE) % | 50 | 50 | 50 | 50 |
|  | NUMBER OF PASSES | 8 | 8 | 8 | 8 |
| PRIMARY DRYING STEP | SURFACE TEMPERATURE OF RECORDING MEDIUM (° C.) | 45 | 45 | 45 | 45 |
|  | AIR BLOWING (AIR VELOCITY m/s) | 2 | 2 | 2 | 2 |
|  | AIR TEMPERATURE (° C.) | 25 | 25 | 25 | 25 |
| EVALUATION | IMAGE QUALITY (SHADE UNEVENNESS) | A | C | C | A |
|  | IMAGE QUALITY (VISIBILITY) | B | B | C | A |
|  | IMAGE QUALITY (OD VALUE) | B | B | C | A |
|  | RUB RESISTANCE | A | C | B | A |
|  | EJECTION STABILITY (WHITE) | C | A | A | C |
|  | PRODUCTIVITY | C | C | C | C |

TABLE 3

|  |  | EXAMPLE | | | |
|---|---|---|---|---|---|
|  |  | 13 | 14 | 15 | 16 |
| WHITE INK ATTACHMENT STEP | TYPE | W01 | W01 | W01 | W01 |
|  | ATTACHMENT AMOUNT mg/inch$^2$ | 3.5 | 5 | 7 | 2 |
| NON-WHITE INK ATTACHMENT STEP | TYPE | C02 | C01 | C01 | C01 |
|  | ATTACHMENT AMOUNT mg/inch$^2$ | 7 | 7 | 7 | 7 |
| RECORDING METHOD | SIMULTANEOUS/STACKING | SIMULTANEOUS | SIMULTANEOUS | SIMULTANEOUS | SIMULTANEOUS |
|  | ATTACHMENT AMOUNT RATIO (WHITE/NON-WHITE) % | 50 | 71 | 100 | 29 |
|  | NUMBER OF PASSES | 8 | 8 | 8 | 8 |
| PRIMARY DRYING STEP | SURFACE TEMPERATURE OF RECORDING MEDIUM (° C.) | 45 | 45 | 45 | 45 |
|  | AIR BLOWING (AIR VELOCITY m/s) | 2 | 2 | 2 | 2 |
|  | AIR TEMPERATURE (° C.) | 25 | 25 | 25 | 25 |
| EVALUATION | IMAGE QUALITY (SHADE UNEVENNESS) | C | B | C | A |
|  | IMAGE QUALITY (VISIBILITY) | B | A | A | C |
|  | IMAGE QUALITY (OD VALUE) | B | C | D | A |
|  | RUB RESISTANCE | B | B | C | A |
|  | EJECTION STABILITY (WHITE) | B | B | B | B |
|  | PRODUCTIVITY | C | C | C | C |

TABLE 3-continued

|  |  | EXAMPLE | | | |
| --- | --- | --- | --- | --- | --- |
|  |  | 17 | 18 | 19 | 20 |
| WHITE INK ATTACHMENT STEP | TYPE | W01 | W01 | W01 | W01 |
|  | ATTACHMENT AMOUNT mg/inch$^2$ | 1 | 1 | 3.5 | 3.5 |
| NON-WHITE INK ATTACHMENT STEP | TYPE | C01 | C01 | C01 | C01 |
|  | ATTACHMENT AMOUNT mg/inch$^2$ | 7 | 2 | 7 | 7 |
| RECORDING METHOD | SIMULTANEOUS/STACKING | SIMULTANEOUS | SIMULTANEOUS | SIMULTANEOUS | SIMULTANEOUS |
|  | ATTACHMENT AMOUNT RATIO (WHITE/NON-WHITE) % | 14 | 50 | 50 | 50 |
|  | NUMBER OF PASSES | 8 | 8 | 8 | 8 |
| PRIMARY DRYING STEP | SURFACE TEMPERATURE OF RECORDING MEDIUM (° C.) | 45 | 45 | 40 | 35 |
|  | AIR BLOWING (AIR VELOCITY m/s) | 2 | 2 | 2 | 2 |
|  | AIR TEMPERATURE (° C.) | 25 | 25 | 25 | 25 |
| EVALUATION | IMAGE QUALITY (SHADE UNEVENNESS) | A | A | C | C |
|  | IMAGE QUALITY (VISIBILITY) | C | D | B | B |
|  | IMAGE QUALITY (OD VALUE) | A | D | C | C |
|  | RUB RESISTANCE | A | A | B | C |
|  | EJECTION STABILITY (WHITE) | B | B | A | A |
|  | PRODUCTIVITY | C | C | C | C |

|  |  | EXAMPLE | | | |
| --- | --- | --- | --- | --- | --- |
|  |  | 21 | 22 | 23 | 24 |
| WHITE INK ATTACHMENT STEP | TYPE | W01 | W01 | W01 | W01 |
|  | ATTACHMENT AMOUNT mg/inch$^2$ | 3.5 | 3.5 | 3.5 | 3.5 |
| NON-WHITE INK ATTACHMENT STEP | TYPE | C01 | C01 | C01 | C01 |
|  | ATTACHMENT AMOUNT mg/inch$^2$ | 7 | 7 | 7 | 7 |
| RECORDING METHOD | SIMULTANEOUS/STACKING | SIMULTANEOUS | SIMULTANEOUS | SIMULTANEOUS | SIMULTANEOUS |
|  | ATTACHMENT AMOUNT RATIO (WHITE/NON-WHITE) % | 50 | 50 | 50 | 50 |
|  | NUMBER OF PASSES | 8 | 8 | 8 | 8 |
| PRIMARY DRYING STEP | SURFACE TEMPERATURE OF RECORDING MEDIUM (° C.) | 50 | 45 | 45 | 45 |
|  | AIR BLOWING (AIR VELOCITY m/s) | 2 | 4 | 1 | 0 |
|  | AIR TEMPERATURE (° C.) | 25 | 25 | 25 | — |
| EVALUATION | IMAGE QUALITY (SHADE UNEVENNESS) | A | A | C | C |
|  | IMAGE QUALITY (VISIBILITY) | B | B | B | B |
|  | IMAGE QUALITY (OD VALUE) | A | A | C | D |
|  | RUB RESISTANCE | A | A | B | C |
|  | EJECTION STABILITY (WHITE) | D | C | A | A |
|  | PRODUCTIVITY | C | C | C | C |

TABLE 4

|  |  | EXAMPLE | | | |
| --- | --- | --- | --- | --- | --- |
|  |  | 25 | 26 | 27 | 28 |
| WHITE INK ATTACHMENT STEP | TYPE | W01 | W01 | W01 | W01 |
|  | ATTACHMENT AMOUNT mg/inch$^2$ | 3.5 | 3.5 | 3.5 | 3.5 |
| NON-WHITE INK ATTACHMENT STEP | TYPE | C01 | C01 | C01 | C01 |
|  | ATTACHMENT AMOUNT mg/inch$^2$ | 7 | 7 | 7 | 7 |

TABLE 4-continued

|  |  |  |  |  |  |
|---|---|---|---|---|---|
| RECORDING METHOD | SIMULTANEOUS/STACKING | SIMULTANEOUS | SIMULTANEOUS | SIMULTANEOUS | SIMULTANEOUS |
|  | ATTACHMENT AMOUNT RATIO (WHITE/NON-WHITE) % | 50 | 50 | 50 | 50 |
|  | NUMBER OF PASSES | 6 | 4 | 8 | 8 |
| PRIMARY DRYING STEP | SURFACE TEMPERATURE OF RECORDING MEDIUM (°C) | 45 | 45 | 45 | 25 |
|  | AIR BLOWING (AIR VELOCITY m/s) | 2 | 2 | 2 | 4 |
|  | AIR TEMPERATURE (°C) | 25 | 25 | 40 | 25 |
| EVALUATION | IMAGE QUALITY (SHADE UNEVENNESS) | C | C | A | C |
|  | IMAGE QUALITY (VISIBILITY) | B | B | B | B |
|  | IMAGE QUALITY (OD VALUE) | C | D | A | D |
|  | RUB RESISTANCE | B | C | A | C |
|  | EJECTION STABILITY (WHITE) | B | B | C | B |
|  | PRODUCTIVITY | B | A | C | C |

|  |  | COMPARATIVE EXAMPLE | | | |
|---|---|---|---|---|---|
|  |  | 1 | 2 | 3 | 4 |
| WHITE INK ATTACHMENT STEP | TYPE | W01 | W05 | W08 | W01 |
|  | ATTACHMENT AMOUNT mg/inch² | 3.5 | 3.5 | 3.5 | 3.5 |
| NON-WHITE INK ATTACHMENT STEP | TYPE | C01 | C01 | C01 | C01 |
|  | ATTACHMENT AMOUNT mg/inch² | 7 | 7 | 7 | 7 |
| RECORDING METHOD | SIMULTANEOUS/STACKING | SIMULTANEOUS | SIMULTANEOUS | SIMULTANEOUS | STACKING |
|  | ATTACHMENT AMOUNT RATIO (WHITE/NON-WHITE) % | 50 | 50 | 50 | 50 |
|  | NUMBER OF PASSES | 8 | 8 | 8 | 8 + 8 |
| PRIMARY DRYING STEP | SURFACE TEMPERATURE OF RECORDING MEDIUM (°C) | 25 | 25 | 25 | 45 |
|  | AIR BLOWING (AIR VELOCITY m/s) | 0 | 0 | 0 | 2 |
|  | AIR TEMPERATURE (°C) | — | — | — | 25 |
| EVALUATION | IMAGE QUALITY (SHADE UNEVENNESS) | D | D | D | A |
|  | IMAGE QUALITY (VISIBILITY) | B | B | B | B |
|  | IMAGE QUALITY (OD VALUE) | D | D | D | A |
|  | RUB RESISTANCE | C | D | C | A |
|  | EJECTION STABILITY (WHITE) | A | A | B | B |
|  | PRODUCTIVITY | C | C | C | D |

|  |  | COMPARATIVE EXAMPLE | | REFERENCE EXAMPLE | |
|---|---|---|---|---|---|
|  |  | 5 | 6 | 1 | 2 |
| WHITE INK ATTACHMENT STEP | TYPE | W01 | W01 | — | W01 |
|  | ATTACHMENT AMOUNT mg/inch² | 3.5 | 7 | — | 3.5 |
| NON-WHITE INK ATTACHMENT STEP | TYPE | C01 | C01 | C01 | — |
|  | ATTACHMENT AMOUNT mg/inch² | 7 | 7 | 7 | — |
| RECORDING METHOD | SIMULTANEOUS/STACKING | STACKING | STACKING | — | — |
|  | ATTACHMENT AMOUNT RATIO (WHITE/NON-WHITE) % | 50 | 100 | 0 | — |
|  | NUMBER OF PASSES | 8 + 8 | 8 + 8 | 8 | 8 |
| PRIMARY DRYING STEP | SURFACE TEMPERATURE OF RECORDING MEDIUM (°C) | 25 | 45 | 45 | 45 |
|  | AIR BLOWING (AIR VELOCITY m/s) | 0 | 2 | 2 | 2 |
|  | AIR TEMPERATURE (°C) | — | 25 | 25 | 25 |
| EVALUATION | IMAGE QUALITY (SHADE UNEVENNESS) | B | A | A | A |
|  | IMAGE QUALITY (VISIBILITY) | B | A | E | A |
|  | IMAGE QUALITY (OD VALUE) | C | A | A | E |
|  | RUB RESISTANCE | B | A | A | A |
|  | EJECTION STABILITY (WHITE) | A | B | — | B |
|  | PRODUCTIVITY | D | D | C | C |

3. Evaluation Result

As described above, according to the comparison between the examples and the comparative examples, the image quality (shade unevenness) was excellent and the productivity was also excellent, in any examples in which the white ink and the non-white ink were simultaneously ejected and recorded and the primary drying step was performed.

On the other hand, either the image quality (shade unevenness) or the productivity was inferior in all of the comparative examples in which the white ink and the non-white ink were not simultaneously ejected and recorded and the primary drying step was not performed.

From the comparison of Examples 1 and 14 to 17, the smaller an attachment amount ratio (white/non-white), the better the image quality (OD value) and the image quality (shade unevenness), and the larger the attachment amount ratio (white/non-white), the better the image quality (visibility).

From the comparison of Examples 1, 3, and 9, the higher the content of the organic solvent of lower than 200° C. contained in the ink, the better the image quality or rub resistance, and the lower the content, the better the ejection stability. In addition, when the organic solvent contained in the ink contains an organic solvent of lower than 200° C. and an organic solvent of 200° C. or higher, all the image quality, the rub resistance, the ejection stability, and the like are well balanced, which is excellent.

From the comparison of Examples 1, 8, and 10, the smaller the content of the organic solvent in the ink, the better the image quality and the like, and the larger the content, the better the ejection stability and the like.

In Comparative Examples 1 to 3, the primary drying step was not performed, the image quality (shade unevenness) was inferior. In addition, the image quality (OD value) also tended to deteriorate.

Comparative Examples 4 to 6 are examples in which the white ink and the non-white ink were not simultaneously ejected and recorded by a stacking method. Although a problem of image quality such as shade unevenness hardly occurred, the recording speed was slow. On the other hand, Examples had excellent productivity.

Reference Example 1 did not use the white ink, and the image quality (visibility) was inferior.

Reference Example 2 did not use the non-white ink, and the image quality (OD value) was inferior.

What is claimed is:

1. A recording method comprising:
   a white ink attachment step of ejecting a white ink composition containing a white coloring material from a white ink jet head, and attaching the white ink composition to a recording medium;
   a non-white ink attachment step of ejecting a non-white ink composition containing a non-white coloring material from a non-white ink jet head, and attaching the non-white ink composition to the recording medium; and
   a primary drying step of heating the white ink composition and the non-white ink composition attached to the recording medium by a drying mechanism,
   wherein in the white ink attachment step and the non-white ink attachment step, a layer containing the white ink composition and the non-white ink composition is formed by performing main scanning multiple times, in which the ink compositions are ejected and attached to the recording medium, and by attaching the white ink composition and the non-white ink composition to a same scanning region in the recording medium such that the white ink composition and the non-white ink composition are mixed in the layer by a same main scanning, while moving a position of an ink jet head relative to the recording medium, and
   wherein a ratio A of an attachment amount of the white ink composition to 100% by mass of an attachment amount of the non-white ink composition is 80% by mass or less, in a region having a largest attachment amount of the non-white ink composition, among regions in the recording medium where the white ink composition and the non-white ink composition are attached.

2. The recording method according to claim 1, wherein in the primary drying step, heating or air blowing is performed.

3. The recording method according to claim 1, wherein in the primary drying step, air blowing is performed, and an air velocity in the air blowing is 0.5 to 5 m/s.

4. The recording method according to claim 1, wherein a surface temperature of the recording medium in the primary drying step is 35° C. to 60° C.

5. The recording method according to claim 1, wherein the main scanning is performed multiple times on a same region in the recording medium.

6. The recording method according to claim 1, wherein the ratio A of the attachment amount of the white ink composition to 100% by mass of the attachment amount of the non-white ink composition is 75% by mass or less, in the region having the largest attachment amount of the non-white ink composition, among regions in the recording medium where the white ink composition and the non-white ink composition are attached.

7. The recording method according to claim 1, wherein a largest attachment amount of the white ink composition in regions in the recording medium where the white ink composition and the non-white ink composition are attached is 10 mg/inch$^2$ or less.

8. The recording method according to claim 1, wherein a content of the white coloring material is 8% by mass or more, based on a total amount of the white ink composition.

9. The recording method according to claim 1, wherein the white ink composition contains organic solvents, and a content of an organic solvent having a standard boiling point of lower than 200° C. among the organic solvents is 50% by mass or more, based on a total amount of the organic solvents.

10. The recording method according to claim 1, wherein the white ink composition contains both-end-type alkanediol having 3 to 5 carbon atoms as an organic solvent.

11. The recording method according to claim 1, wherein the white ink composition contains an organic solvent, and a maximum value of a standard boiling point of the organic solvent is 250° C. or lower.

12. The recording method according to claim 1, wherein the white ink composition contains organic solvents, and the organic solvents include an organic solvent having a standard boiling point of lower than 200° C. and an organic solvent having a standard boiling point of 200° C. or higher.

13. The recording method according to claim 1, wherein each of the white ink composition and the non-white ink composition is an aqueous ink composition or each of the white ink composition and the non-white ink composition is a solvent-based ink composition.

14. The recording method according to claim 13, wherein
each of the white ink composition and the non-white ink composition is the aqueous ink composition, and
a content of an organic solvent in each of the white ink composition and the non-white ink composition is 30% by mass or less.

15. The recording method according to claim 1, wherein the recording medium is a low-absorbent recording medium or a non-absorbent recording medium.

16. A recording device that performs recording by the recording method according to claim 1, comprising:
- a white ink jet head configured to eject a white ink composition containing a white coloring material, and attach the white ink composition to a recording medium;
- a non-white ink jet head configured to eject a non-white ink composition containing a non-white coloring material, and attach the non-white ink composition to the recording medium;
- a drying mechanism configured to dry the white ink composition and the non-white ink composition attached to the recording medium; and
- a control section configured to perform control of recording by using the white ink jet head and the non-white ink jet head.

* * * * *